Jan. 19, 1926. 1,570,256
G. M. HUNT
LOADER
Filed July 12, 1924 2 Sheets-Sheet 1
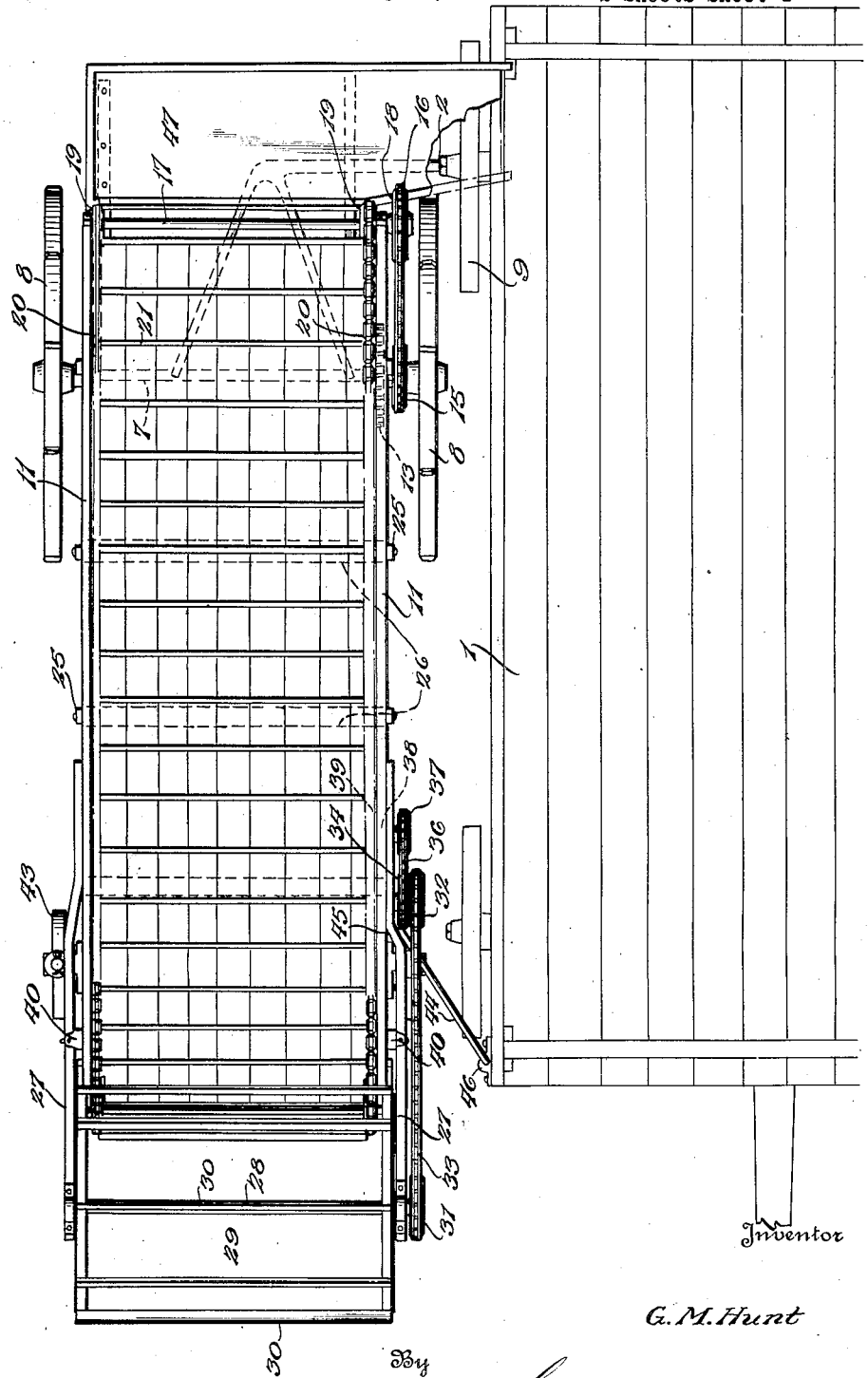
Inventor
G. M. Hunt
By
Lacey Lacey, Attorneys

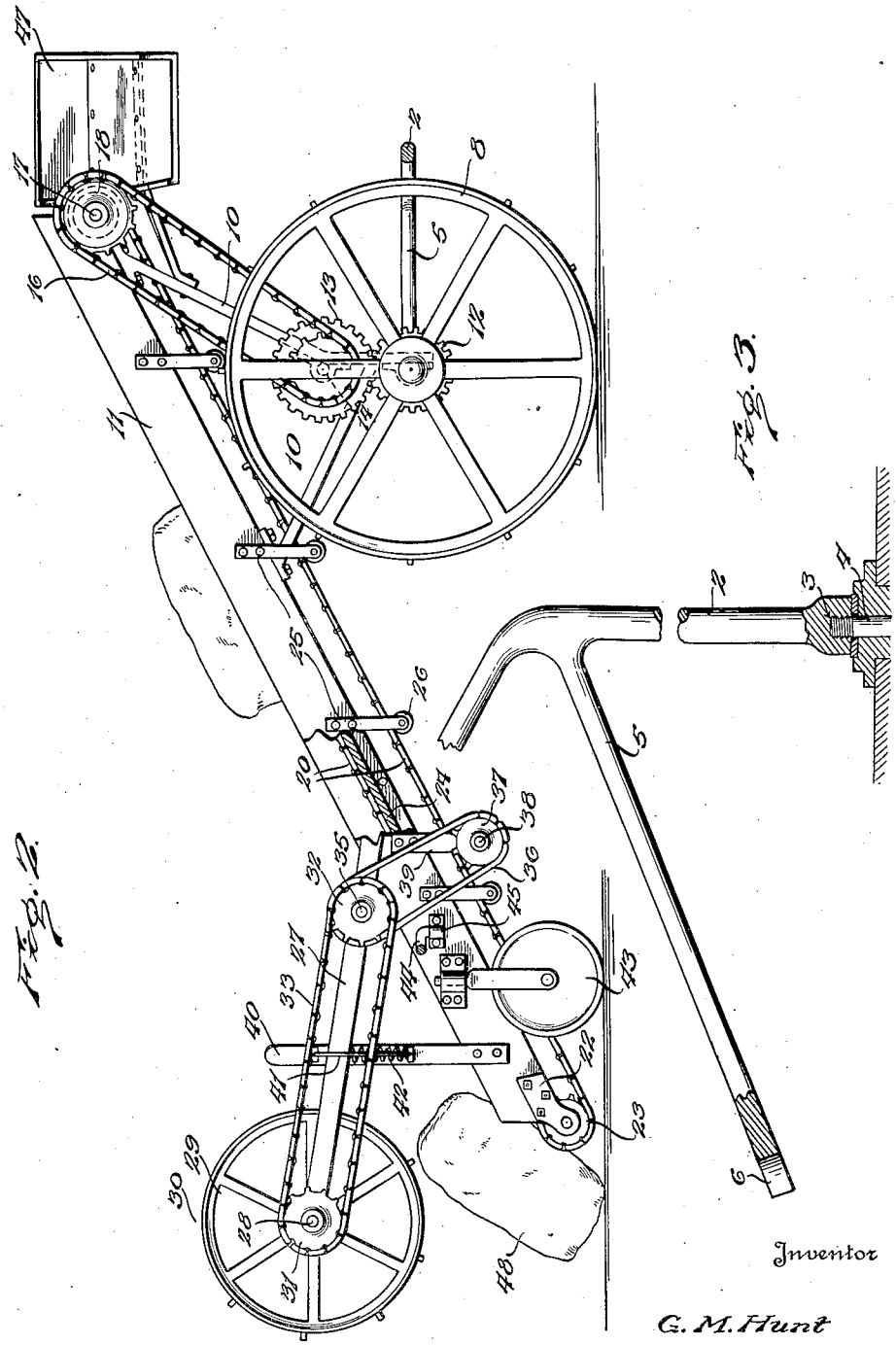

Patented Jan. 19, 1926.

1,570,256

UNITED STATES PATENT OFFICE.

GLEN M. HUNT, OF SAGUACHE, COLORADO.

LOADER.

Application filed July 12, 1924. Serial No. 725,565.

*To all whom it may concern:*

Be it known that I, GLEN M. HUNT, a citizen of the United States, residing at Saguache, in the county of Saguache and State of Colorado, have invented certain new and useful Improvements in Loaders, of which the following is a specification.

This invention is an apparatus for loading filled sacks onto a wagon and is designed primarily for use in taking up potatoes which have been harvested and placed in sacks. It is a common practice in harvesting potatoes to place the potatoes in sacks in the field and leave the filled sacks to be subsequently gathered. When the work of taking up the sacks and placing them in a wagon or other vehicle to be carried to a place of storage or use is done by hand, it proves very laborious and time-consuming as well as costly, and it is the object of my invention to provide simple and compact means which may be easily connected with a wagon and disposed at the side of the same and operated in such a manner that, as the wagon is drawn over the field, the filled sacks will be taken up and loaded into the wagon expeditiously thereby reducing the cost of the harvest. This object is attained in such an apparatus as is illustrated in the accompanying drawings, and the invention resides in certain novel features which will be particularly pointed out in the appended claim.

In the drawings:

Figure 1 is a plan view, partly broken away, of one embodiment of my invention showing the same coupled to a wagon;

Fig. 2 is a side elevation, partly broken away, of the loading mechanism, and

Fig. 3 is an enlarged detail.

The wagon or other vehicle 1 may be of any preferred form and may be drawn by draft animals or by a tractor as may be most convenient or preferred. In carrying out my invention, the hub nut which retains one wheel upon the rear axle of the wagon is removed and a coupling, shown in detail in Fig. 3, is substituted therefor. This coupling comprises a bar 2 having an internally threaded socket 3 in one end which is adapted to be engaged over the threaded end of the spindle 4 of the rear axle after the usual hub nut has been removed. The bar 2 projects laterally from the wagon in axial alinement with the axle or spindle 4 and at its outer end merges into the diverging arms 5 which project forwardly and are forked, as shown at 6, or otherwise constructed at their forward extremities to engage and support an axle 7 carrying ground wheels 8. The axle 7 will be so disposed that the wheels 8 will be somewhat in advance of the rear wheels 9 of the wagon so that there will be no interference between the two wheels in the use of the machine. The axle 7 is journaled in the lower ends of side frames 10 which extend upwardly therefrom and serve to support the side bars 11 of the loader. The frames 10 may be of any convenient form and are illustrated in Fig. 2 as consisting of diverging bars so that they define an open substantially Y-shaped member. A gear wheel 12 is secured upon the axle 7 and meshes with a gear wheel 13 secured upon a stub shaft 14 which is mounted in suitable bearings upon the adjacent side frame and also carries a sprocket pinion 15 around which is trained a sprocket chain 16. A stub shaft 17 is suitably supported at the upper rear ends of the side rails 11 and a sprocket wheel 18 is secured upon one end of said shaft to be driven by the sprocket chain 16 in an obvious manner. Between the side rails 11, sprockets 19 are secured upon the shaft 17 and parallel sprocket chains 20 are trained about the same, said chains being connected at intervals by cross bars 21 for a purpose which will presently appear. At the lower forward ends of the side rails 11 are brackets 22 carrying sprockets 23 about which the chains 20 are trained, and it will be readily seen that, when the wagon is drawn over the field, the travel will be imparted to the loader and the described gearing will cause the chains 20 with their cross bars 21 to move in such direction that their upper runs will move upwardly between the side rails 11 of the loader frame. The said upper runs of these chains are supported by a platform or deck 24 which is secured to and between the rails 11 and extends longitudinally of the same. Brackets or hangers 25 are secured to the side rails at intervals and depend below the same to carry rollers 26 which support the lower runs of the chains 20 and thereby prevent sagging of the same and consequent interference thereof with the proper operation of the machine. At proper points in the length of the side rails 11, I secure thereto the forwardly projecting arms 27 on the forward free ends of which is jounaled a reel shaft 28 which has secured thereto, between the said arms, a reel 29 consisting of circular end members and cross bars or beaters 30 secured to and extending between the said end members. Upon one end of the shaft 28 is secured a sprocket 31 and upon the adjacent arm 27, near the corresponding side rail 11, is secured a similar sprocket 32, a sprocket chain 33 being trained around the sprockets 31 and 32, as shown clearly in Fig. 2. A second sprocket 34 is secured upon the shaft 35 which carries the sprocket 32, and a chain 36 is trained about the said sprocket 34 and a similar sprocket 37 which is carried by a shaft 38 supported in a hanger 39 which is secured to and depends from the adjacent side rail 11. This shaft 38 also carries a second sprocket 39' which meshes with and is driven by the lower run of the adjacent chain 20. As there is always a possibility that the bolts securing the arms 20 may work loose, I provide upon the side rails 11 near the lower front ends thereof posts 40 which extend upwardly at the inner sides of the respective arms 27 and are equipped upon their outer sides with the retaining loops 41, and springs 42 are secured in any convenient manner upon the said posts so as to bear against the under sides of the arms 27 and thereby yieldably hold said arms in their upper positions so that the reel will be maintained in operative relation to the elevator.

The forward end of the elevator which comprises the chains 20 and the parts cooperating with and supporting the same is equipped with casters 43 whereby the end of the elevator is prevented from digging into the ground and will be supported in such position that it will readily conform to the path followed by the wagon. To maintain the spaced relation of the front end of the wagon and the front end of the loader, a coupling rod 44 is provided, one end of said rod being engaged in a bracket 45 secured upon the adjacent side rail 11 of the loader and the opposite end of the rod being engaged in a similar bracket 46 secured upon the side of the wagon at the front end of the same.

Supported in any convenient manner at the upper rear ends of the side rails 11 is a transversely extending chute 47 which projects laterally from the loader to extend over the side of the wagon and direct the sacks into the latter.

It is thought the operation of my machine will be readily understood from the foregoing description, taken in connection with the accompanying drawings. The filled sacks, indicated at 48, are left in the field in rows after they have been filled with potatoes and the wagon is then drawn over the field alongside and parallel with the several rows so that the loader will be alined with a row of sacks which are to be gathered. Rotation will be imparted to the ground wheels 8 by reason of their contact with the ground and the rigid coupling of the loader with the wagon to which draft is directly applied. This rotation of the ground wheels will be transmitted through the described gearing so that the reel 29 will be rotated in the proper direction to engage the sacks and topple the same over onto the upper run of the elevator provided by the chains 20 and the cross bars 21, as indicated in Fig. 2. The sack which is toppled over by the reel in this manner will be caused to rest upon the cross bars 21 of the elevator and the travel of the said bars will obviously then impart an upward travel to the sacks so that they will be carried up to the chute 27 and deposited into the same and as the floor or bottom of this chute is inclined downwardly toward the wagon the force of gravity will operate to cause the filled sack to slide through the chute into the wagon. An attendant may be stationed in the wagon to arrange the sacks in proper order therein as they are received so that the sacks will not accumulate immediately at the discharge end of the chute.

By the use of my apparatus, a large number of filled sacks may be very easily and quickly taken up and deposited in a wagon so that the crop of potatoes may be very rapidly brought into a warehouse or delivered at a point of use. The loading mechanism is very simple in construction and compact in the arrangement of its parts and when coupled to a wagon, as shown and described, will be firmly maintained in operative relation thereto so that it will be forced to travel over the field at the side of the wagon to take up the filled sacks.

Having thus described the invention, I claim:

An apparatus for loading sacks of potatoes into a wagon consisting of an elevating conveyer inclined upwardly from front to rear, rolling supports for said conveyer, means for coupling the ends of said conveyer to the front and rear end portions respectively of a wagon whereby the conveyer will be caused to travel alongside the wagon, gearing connecting the rear rolling supports with the conveyer to actuate the conveyer, a chute extending laterally from the upper rear end of the conveyer over the side of the wagon to discharge the sacks into the wagon, arms projecting forwardly from the conveyer near and above the front end thereof, a real carried by the front ends of said arms, means actuated by the conveyer for rotating the reel whereby to topple standing filled sacks onto the conveyer, posts rising from the conveyer, retainers on said posts engaged around said arms, and springs within the retainers below and bearing against the arms.

In testimony whereof I affix my signature.

GLEN M. HUNT. [L. S.]